INVENTORS
EDWARD A. LUIZ
MARSHAL B. THORNTON

ATTORNEYS

July 5, 1960

E. A. LUIZ ET AL 2,943,686

HYDRAULIC CONTROL SYSTEM FOR AN AERONAUTICAL PROPELLER

Filed Dec. 18, 1956

INVENTORS
EDWARD A. LUIZ
MARSHALL B. THORNTON
BY
Teller & McCormick
ATTORNEYS

2,943,686

HYDRAULIC CONTROL SYSTEM FOR AN AERONAUTICAL PROPELLER

Edward A. Luiz, Springfield, Mass., and Marshall B. Thornton, Granby, Conn., assignors to United Aircraft Corporation, East Hartford, Conn., a corporation of Delaware Filed Dec. 18, 1956, Ser. No. 629,099

7 Claims. (Cl. 170—135.72)

This invention relates to an improved aeronautical propeller and, more specifically, to an hydraulic system for controlling the pitch of the propeller blades.

It is the general object of the invention to provide in an hydraulic pitch control system for an aeronautical propeller improved mechanical valve actuating means which is manually operable to control the propeller through all pitch changes including feathering and reversing and which can be operated automatically by mechanical means for feathering when emergency conditions warrant such action, and it is a specific object of the invention to provide the mechanical valve actuating means in such form that it cannot be operated by the automatic mechanical means during manual operation thereof which gives rise to conditions duplicating the conditions calling for emergency automatic feathering.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
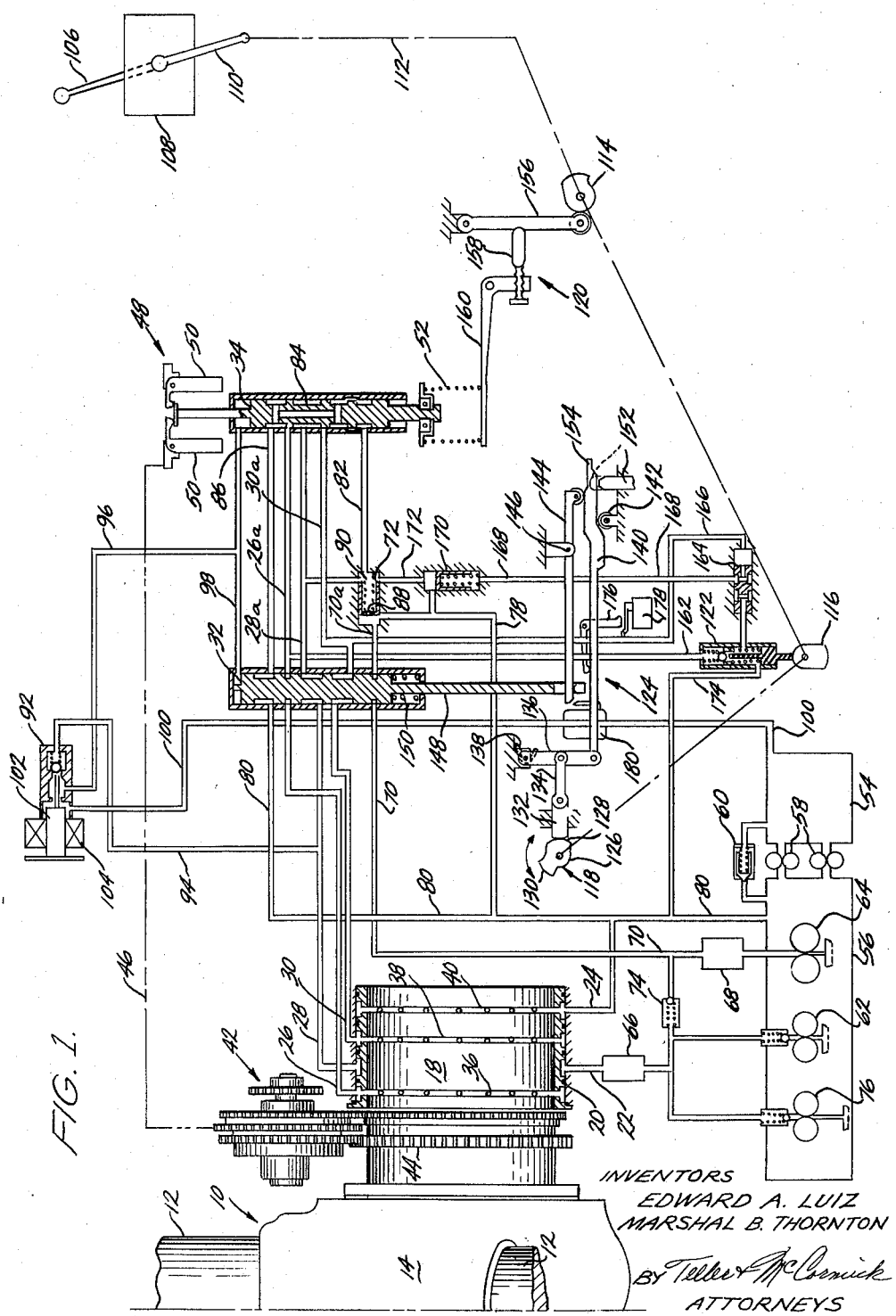
Fig. 1 is a schematic view of an aeronautical propeller and the hydraulic system therefor in accordance with the present invention.

The reference numeral 10 designates generally a propeller assembly which includes a plurality of adjustable pitch blades 12, 12 and a hub 14 having a nose section (not shown). The propeller assembly 10 also includes a conventional pitch changing mechanism in the form of an hydraulic motor which comprises a cylinder in the nose section and a piston movable within the cylinder responsive to hydraulic pressure introduced to the cylinder on either side of the piston. Thus, the piston is reciprocable within the cylinder and can be moved selectively therein. By means of cam slots and cam rollers, rectilinear movement of the piston within the cylinder rotates a gear within the hub 14, the said gear being engaged by gears or segments on the inner ends of the propeller blades 12, 12 whereby to change the pitch of the blades by rotating them on their generally longitudinal pitch change axes. Thus, movement of the piston within the cylinder in one direction is employed to effect a change in the pitch angle toward high pitch and movement of the piston in the opposite direction is used to effect a change toward low pitch. An hydraulic motor type pitch changing mechanism is shown in the Anderson Patent No. 2,653,668 and there is a further showing and description of an hydraulic motor of the type mentioned in the Pearl Patent No. 2,703,148 to which reference may be had. Pitch changing mechanism of this type is used to feather the propeller blades and to reverse their pitch as well as to effect the more routine pitch adjustments.

Obviously, an hydraulic motor of the aforedescribed type can be operated if means are provided to route hydraulic fluid under pressure selectively to one side or to the other side of the motor piston while connecting the opposite side to drain. Such means can be considered as part of the pitch changing mechanism or it can be considered as part of an hydraulic control system for the said mechanism. While means adapted to function in the aforedescribed way may take various forms, the exemplary means used in the system to be described comprises a transfer bearing having an inner ring or section 18 which rotates with the propeller assembly 10 and an outer ring or section 20 which does not rotate but which embraces the said inner ring.

It will be observed that a plurality of conduits 22, 24, 26, 28 and 30 are connected to the outer, non-rotatable section 20 of the transfer bearing. The conduit 22 communicates with a source of hydraulic fluid under pressure as will be described hereinafter, but it does not introduce the hydraulic fluid to the pitch changing mechanism. That is, the bearing section 20 is constructed and arranged to connect the conduit 22 with the conduit 28 which extends to a feathering valve 32. Thus, fluid at source or pump pressure is directed to the feathering valve before it is introduced to the pitch changing mechanism. The feathering valve 32 is normally positioned as shown in the drawings to pass the fluid from the conduit 28 to a conduit 28a and on to a pilot or control valve 34. The pilot valve operates to pass the fluid at pump pressure from the conduit 28a to a conduit 26a or to a conduit 30a which respectively communicate at the feathering valve 32 with the conduits 26 and 30.

The conduit 26 at the transfer bearing communicates through the non-rotatable section 20 with an annular port 36 in the rotatable section 18 and the conduit 30 at the transfer bearing communicates through the non-rotatable section with an annular port 38 in the rotatable section. The ports 36 and 38 are respectively connected with passage means (not shown) extending to opposite sides of the piston in the hydraulic motor, the arrangement being such that when pressurized hydraulic fluid is introduced through the port 36 from the conduit 26, the blade angle is decreased toward low pitch and when hydraulic fluid is introduced under pressure through the passage 38 from the conduit 30, the blade angle is changed toward high pitch. Accordingly, the conduit 26 can be called a low pitch inlet conduit for the pitch changing mechanism and the conduit 30 can be called a high pitch inlet therefor. The rotatable bearing section 18 has another annular port 40 which receives hydraulic fluid under drain pressure from the hydraulic motor, this port being connected with the conduit 24 which extends to a main drain conduit to be described.

As its name would imply, the feathering valve 32 is operated only to connect the pump conduit 28 with the high pitch conduit 30 in a feathering operation. At all other times, the feathering valve 32 remains in the position shown in Fig. 1 whereby to effect communication between the low pitch conduit 26 and the conduit 26a extending to the pilot valve 34; between the pump conduit 28 and the conduit 28a extending to the pilot valve; and between the high pitch conduit 30 and a conduit 30a extending to the pilot valve. Only the pilot valve 34 is moved to effect selective connection between the pump conduit and the low and high pitch conduits, respectively, to bring about all pitch changes except the change to "feathering." The pilot or control valve 34 can be moved either by automatic speed responsive mechanism or by manually actuated mechanism. At this point, only the automatically operable speed responsive mechanism will be described.

Figure 3:
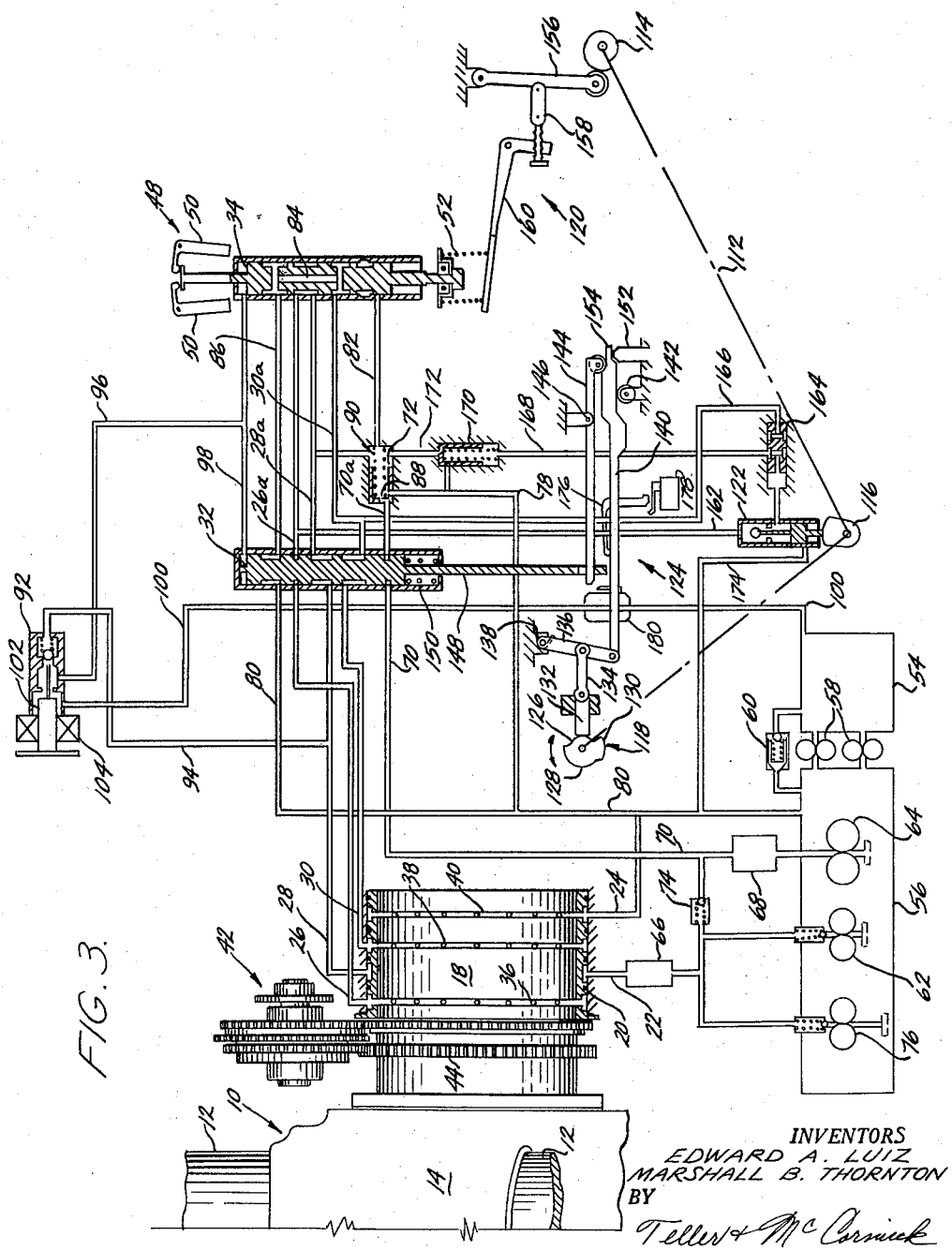
Fig. 3 is similar to the other views, but shows the hydraulic system conditioned for reversing.

The said automatically operable mechanism is responsive to propeller speed and is driven by the propeller. More specifically, a differential gear unit indicated generally at 42 is arranged to be driven by a gear 44 which is rotatable with the propeller assembly 10 and the differential unit 42 is connected as indicated schematically by the line 46 with the speed responsive mechanism 48 which controls the position of the pilot valve 34. The flyweights 50, 50 forming a part of the mechanism 48 are arranged to be thrown outwardly by centrifugal force during rotation of the propeller assembly and to bear against the valve 34 thrusting it downwardly. The greater the propeller speed, the farther downwardly the valve 34 will be thrust. When the pilot valve is thrust downwardly, it effects a connection between the pump conduit 28a and the high pitch conduit 30a whereby the pitch changing mechanism is operated to effect a change toward high pitch which reduces propeller speed. If the propeller speed is low, the flyweights 50, 50 will be retracted and the pilot valve 34 will be thrust upwardly by a spring 52 engaging the bottom of the pilot valve. When the pilot valve is thrust upwardly as is best shown in Fig. 3, it connects the pump conduit 28a with the low pitch conduit 26a whereby the pitch changing mechanism is operated to effect a change toward low pitch which will increase propeller speed.

Referring now to the hydraulic system in greater detail, it will be seen that the source of pressurized hydraulic fluid includes an atmospheric sump 54 and a pressurized sump 56. Hydraulic fluid is transferred from the atmospheric sump 54 and introduced under pressure to the pressurized sump 56 by one or more pumps 58, 58. A relief valve 60 is located in a conduit between the pressurized sump and the atmospheric sump to drain fluid from the pressurized sump into the atmospheric sump when necessary.

The hydraulic fluid is withdrawn from the pressurized sump 56 and introduced to the system under additional pressure by means of a main pump 62 and standby pump 64. The main pump and the standby pump are preferably driven by the propeller and to this end a driving connection (not shown) can be effected between the differential gearing 42 and the said pumps. Normally, only the main pump 62 supplies hydraulic fluid to the conduit 22 through a filter 66 and the standby pump 64 pumps the fluid through a filter 68 into a conduit 70. The conduit 70 extends to the feathering valve 32 and normally communicates therethrough with a conduit 70a which extends to a standby valve 72. However, when the passage 70 is blocked at the feathering valve 32, the increased pressure in the conduit 70 will open a check valve 74 causing flow from the standby pump 64 to enter the transfer bearing conduit 22 through the filter 66. During periods when the propeller is not driven, the hydraulic system can be employed to operate the pitch changing mechanism by means of a motor-driven auxiliary pump 76 which passes the hydraulic fluid through the filter 66 into the transfer bearing pump inlet conduit 22, the main pumps 62 and 64 not being in operation.

As previously mentioned, during normal propeller operation when only routine pitch changes are required, the feathering valve 32 is positioned as shown in Fig. 1 of the drawings. In such position of the feathering valve, hydraulic fluid at pump pressure from the source passes through the transfer bearing into the conduit 28 which extends to the feathering valve and there communicates with the conduit 28a extending to the pilot valve. When there is no pitch change required, the pilot valve 34 will be positioned to block the end of the conduit 28a. Under the aforesaid conditions of operation, the hydraulic fluid pumped by the standby pump 64 through the conduit 70 and the feathering valve 32 is returned to the pressurized sump through the normally open standby valve 72 and a conduit 78 and a main drain conduit 80. Also, under the aforesaid conditions, there is no hydraulic flow in the conduits 26 and 30 extending from the feathering valve to the transfer bearing. That is, the feathering valve 32 is positioned to prevent flow from the pump conduit 28 into either of the conduits 26 or 30 and the pilot valve 34 is positioned to prevent flow from the conduit 28a into either of the conduits 26a or 30a.

However, there will be some flow through the pilot valve 34. That is, a conduit 82 extending from the standby valve 72 communicates through an internal passage 84 in the pilot valve 34 with a conduit 86 extending between the said pilot valve and the feathering valve 32. At the feathering valve 32, the conduit 86 communicates with the main drain conduit 80. The aforesaid flow from the conduit 82 through the pilot valve to drain comes from the standby valve 72 which is connected to the standby pump conduit 70a. Most of the fluid from the standby pump conduit is drained in the valve 72 through the conduit 78 as described, but some of the flow passes to the conduit 82 and to the pilot valve through a small aperture 88 provided in the said standby valve. Whenever the pilot valve 34 is moved upwardly or downwardly, it blocks flow between the conduit 82 and the internal passage 84. With the internal passage 84 blocked, the pressure will build up in the conduit 82 until it is substantially equal to the pressure in the conduit 70a. Under these pressure conditions, the standby valve spring 90 will close the standby valve 72 whereby standby pressure will increase in the conduits 70 and 82 to the point where the standby check valve 74 opens. Then, flow from the standby pump 64 will pass through the main filter 66 to the transfer bearing with flow from the main pump 62.

Having described the pitch control hydraulic system as comprising a source of hydraulic fluid under pressure, a feathering valve and a pilot or control valve, and having described the speed responsive automatic operation of the pilot valve to effect the routine operational pitch changes toward high and low pitch, consideration can now be given to the operation of the system to effect feathering and reversing.

Figure 2:
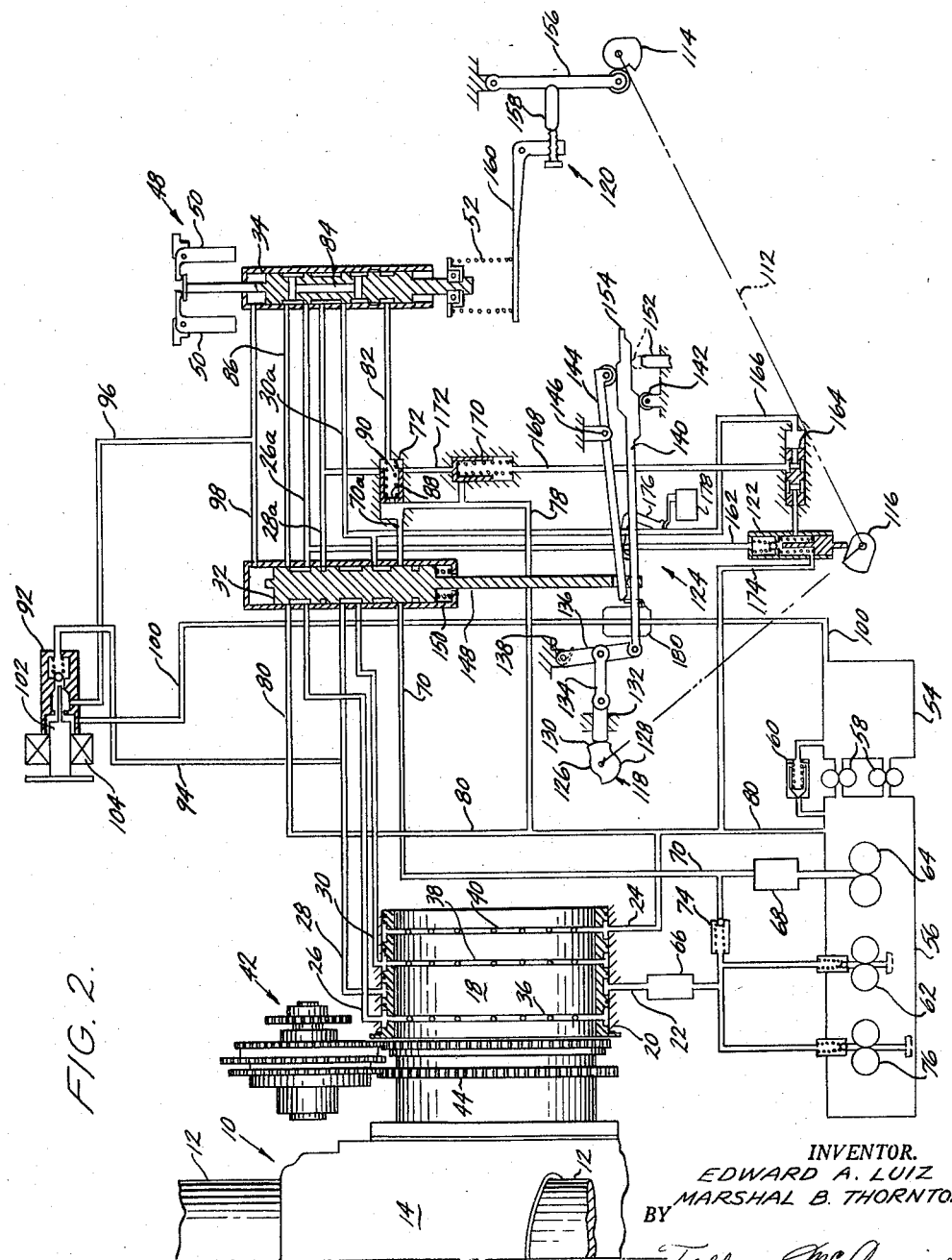
Fig. 2 is similar to Fig. 1, but shows the hydraulic system conditioned for feathering by manual operation of the valve actuating means.

Propeller feathering can be effected by hydraulic actuation of the feathering valve 32 and/or the pilot valve 34 or feathering can be effected by manual or automatic operation of mechanical means for actuating the feathering valve or feathering can be effected by simultaneous operation of the hydraulic and the mechanical valve actuating means. The hydraulic actuating means includes a normally closed check valve 92 which is connected between a conduit 94 extending from the pump conduit 28 and a conduit 96 extending to a conduit 98 which interconnects the top ends of the chambers for the feathering and control valves 32 and 34. A drain conduit 100 also extends from the check valve 92 to the atmospheric sump 54. The check valve construction includes an armature 102 which can be moved from the normal position shown in the drawings toward the right either manually or by influence of a solenoid coil 104 to close the drain passage 100 and to open the ball check whereby to effect communication between the conduits 94 and 96. This will cause hydraulic fluid at pump pressure to flow to the chambers at the tops of the feathering valve 32 and the pilot or control valve 34, forcing the said valves downwardly. Movement of the feathering valve downwardly interconnects the pump conduit 28 with the high pitch conduit 30 as shown in Fig. 2 and the propeller will change pitch through the high pitch range into full feather as long as hydraulic pressure holds the feathering valve down.

Movement of the pilot valve 34 downwardly is of no effect as long as the feathering valve is moved downwardly as described, but if the feathering valve sticks in the normal "up" position, such movement of the pilot valve by hydraulic pressure will effect feathering. That is, when the pilot valve is thrust downwardly, the conduits 28a and 30a are interconnected and if the feathering valve is in its normal position the flow will be through the feathering valve to the transfer bearing to effect a high pitch change to the full feather position as long as the pilot valve is held down by hydraulic pressure.

The mechanical means for actuating the feathering valve 32 can, as previously mentioned, be operated manually, or automatically under certain emergency conditions, to effect feathering. The means for effecting manual operation includes a power lever 106 which is connected through a coordinator 108 with a crank 110 which in turn is connected through suitable motion transmitting means indicated schematically by the line 112 with a plurality of rotatable cams 114, 116 and 118. The power lever 106 is the main control device operated by the pilot or flight engineer to control propeller pitch through the complete range of propeller operation. That is, the power lever is selectively positioned to call for a desired pitch, and in being moved from one position to another the cams 114, 116 and 118 are rotated to operate the various valves within the system. The cam 114 operates valve actuating means in the form of motion transmitting linkage mechanism indicated generally at 120 to control the effective force of the spring 52 on the pilot valve 34 as will be described in detail hereinafter. The cam 116 controls operation of a check valve 122 as will be described, and the cam 118 operates a motion transmitting linkage mechanism indicated generally at 124 to control the feathering valve 32 as will now be described.

It will be observed that the rotatable cam 118 has three peripheral sections 126, 128 and 130 of differing radial dimension from its axis of rotation, the section 126 being of less radial dimension than the section 128 which in turn is of less radial dimension than the section 130. It will also be observed that the said cam is engaged by a follower 132 which is biased toward the cam. The arrangement of the cam 118 is such that its radially lesser portion 126 will engage the follower 132 when the power lever 106 is positioned for propeller reversing, the portion 128 will engage the follower for routine propeller operation other than feathering and reversing, and the portion 130 will engage the follower for feathering. In Fig. 1 wherein the cam portion 128 engages the follower 132, the linkage 124 is in an intermediate position and the feathering valve 32 is in its normal or up position. In Fig. 2 wherein the cam portion 130 engages the follower 132, the linkage 124 is moved to the right and the feathering valve is pulled down to effect feathering as described. In Fig. 3 wherein the cam portion 126 engages the follower 132, the linkage is moved to the left and the feathering valve is in its normal or up position.

In moving from the position shown in Fig. 1 to the position shown in Fig. 2, the cam 118 thrusts the follower 132 toward the right. The follower 132 is connected through a pivoted link 134 with a pivotally supported arm 136 and pivots the arm counterclockwise against a spring 138 which biases the follower into engagement with the cam. The swinging end of the arm 136 is connected to a link comprising an elongated cam bar 140 which is thrust toward the right and rides upwardly on a roller 142. A lever 144 which is pivotally supported between its ends at 146 is engaged at the right end by the cam bar 140 and pivoted counterclockwise. The other or left end of the lever 144 is engaged with the lower end of a depending extension or stem 148 on the feathering valve 32 and pulls the feathering valve downwardly against the force of a spring 150 to effect feathering as described.

The automatically operable means for operating the aforedescribed mechanical linkage mechanism 124 to actuate the feathering valve includes a plunger 152. As shown in Fig. 1, the plunger 152 is located near the right-hand end of the cam arm 140 and therebelow. When thrust upwardly to its broken line position, as also shown in Fig. 1 (the full line position in Fig. 3), it will engage and elevate the cam bar 140 and thus rotate the lever 144 counterclockwise to pull the feathering valve 32 down. Obviously, the plunger 152 can be thrust upwardly by any means desired and it can be thrust upwardly manually to effect feathering and thus the plunger provides another means for manual actuation of the feathering valve. However, it is most desirable to provide means (forming no part of this invention) to thrust the plunger upwardly automatically under emergency conditions where propeller feathering is necessary. Such emergency conditions are encountered when engine power output is insufficient for propeller rotation at the pitch setting and the propeller thus develops negative torque and excessive drag. This may be occasioned by engine failure under forced operating conditions as, for example, during take-off. Therefore, means (not shown) are provided to thrust the plunger upwardly automatically to actuate the feathering valve when negative propeller torque is developed. However, the provision of such means presents a problem in reversing the propeller where negative torque is also encountered.

This problem is solved in accordance with the present invention in the construction of the rotatable cam 118 and the cam bar 140. That is, the cam 118 is constructed so that its low section 126 will be engaged by the follower 132 when the power lever 106 is positioned to condition the hydraulic system for reversing as shown in Fig. 3. This permits the cam bar 140 to move toward the left bringing its right-hand end section 154 over the plunger 152 as shown in Fig. 3. The said end section 154 is higher than the portion of the cam bar normally engaged by the plunger 152 to elevate it and, therefore, when the plunger is thrust upwardly with the cam bar toward the left, it will not elevate the cam bar to actuate the feathering valve.

The aforementioned propeller reversing is effected by the reversing cam 114 and the motion transmitting linkage 120 acting on the pilot valve 34. More specifically, when the power lever 106 is positioned for reversing, the high point on the cam 114 is rotated to thrust a pivotally supported depending arm 156 toward the left. An adjustable link 158 connects the arm 156 with a bell crank 160 which seats the pilot valve spring 52, the arrangement being such that left-hand movement of the arm 156 moves the spring and thus the pilot valve 34 upwardly. As previously mentioned, when the pilot valve is thrust upwardly, hydraulic flow at pump pressure is directed into the low pitch lines 26a and 26 whereby a change toward low pitch is effected. By holding the valve upwardly with the cam 114 and the linkage 120, the pitch change is through the low pitch range into the reverse angle of pitch.

In addition to controlling the reverse operation, the cam 114 and linkage mechanism 120 is used in routine operation or pitch control by the pilot. That is, the power lever when adjusted in routine operation will vary the force on the pilot valve spring 52 to select a position for the pilot valve. Then, the speed responsive mechanism will operate to shift the pilot valve against the spring force for constant speed propeller operation. In effect, the spring 52 is adjusted in the manner described to select a propeller operating speed.

While not of critical importance is consideration of this invention, it should be observed that the cam 116 is positioned during propeller reversing to open the check valve 122. Whenever the valve 122 is opened, communication is effected between a conduit 162 and a selector valve 164, the conduit 162 being connected with the low pitch conduit 26a and the selector valve 164 being also connected with a conduit 166 extending to the high pitch conduit 30a. Whenever the pilot valve 34 is operated to increase pitch, or whenever the pilot valve is operated to feather the propeller when the feathering valve 32 sticks as described, the high pitch conduit 30a will contain fluid at pump pressure and the selector valve will be thrust to the left as shown in Figs. 1 and 2 and the fluid at pump pressure will be directed through the selector valve and a conduit 168 to close a valve 170 in a conduit 172 extending from the supply or pump conduit 28a to the drain conduit 78. Thus when feathering is required by operation of the pilot valve and during inoperation of the feathering valve, the pump conduit drain 172 is closed to bring full pump pressure into the feathering action. When reversing is required and the valve 122 is open, flow to the selector valve 164 will be from the low pitch conduit 26a, the conduit 162 and the check valve 122 to move the selector 164 to the right. The flow will continue to the conduit 168 and the valve 170, closing the drain 172 for the pump conduit 28a and bringing full pump pressure into the reversing operation. Whenever the selector valve 164 is moved from right to left with the check valve 122 closed, entrapped fluid drains from the check valve through a conduit 174.

Another advantage of the feather actuating linkage described is that it is adapted for easy and efficient ground checking of the feathering valve 32 and the operation of the means for automatically thrusting the feathering plunger 152. That is, during ground checking and with the engine running, fuel to the engine can be cut off or sharply reduced to create a negative torque condition. If the plunger actuating means is functioning properly, it will thrust the plunger 152 to elevate the cam bar 140. In so doing, the cam bar will rotate a bell crank shaped trip 176 clockwise to energize a switch 178 which can close a circuit to a signal lamp (not shown) in the cabin or cockpit. With the engine not in operation, the power lever 106 can be placed in the feather position to rotate the feathering cam 118 to the position shown in Fig. 1 whereby the actuating mechanism 124 will pull the feathering valve 32 down. In so doing, the lever 144 will engage and close a switch 180 which may energize a signal lamp in the cabin or cockpit. This indicates that the feathering valve 32 is operating properly.

The invention claimed is:

1. A control system for an aeronautical propeller having hydraulic pitch changing mechanism and comprising, a feathering valve and a control valve connected with the pitch changing mechanism and connected with a source of hydraulic fluid under pressure, the feathering valve being selectively movable to open position whereby to supply fluid to the pitch changing mechanism for propeller feathering and the control valve being selectively movable to open position whereby to supply fluid to the pitch changing mechanism for propeller reversing, a three position motion transmitting means engaging the feathering valve and movable between a first and a second position without opening the feathering valve and movable from its second to a third position to open the feathering valve, a plunger engageable with said motion transmitting means in its second position only to move it to its said third position, actuating means engaging said control valve and operable to open the control valve, and manual operating means for said actuating means including positioning means engaging said motion transmitting means and adapted to place the motion transmitting means in its first position while said control valve is open for propeller reversing.

2. A control system for an aeronautical propeller having hydraulic pitch changing mechanism and comprising, a feathering valve and a control valve connected with the pitch changing mechanism and connected with a source of hydraulic fluid under pressure, the feathering valve being selectively movable to open position whereby to supply fluid to the pitch changing mechanism for propeller feathering and the control valve being selectively movable to open position whereby to supply fluid to the pitch changing mechanism for propeller reversing, motion transmitting means engaging the feathering valve including a link movable between a first and a second position without effecting movement of the feathering valve and movable from its second to a third position to effect opening movement of the feathering valve, a plunger engageable with said link in its said second position only to move it to its said third position, actuating means engaging said control valve and operable to open the control valve, and manual operating means for said actuating means including positioning means engaging said motion transmitting means and adapted to place said link in its first position while said control valve is open for propeller reversing.

3. A control system for an aeronautical propeller having hydraulic pitch changing mechanism and comprising, a feathering valve and a control valve connected with the pitch changing mechanism and connected with a source of hydraulic fluid under pressure, the feathering valve being selectively movable to open position whereby to supply fluid to the pitch changing mechanism for propeller feathering and the control valve being selectively movable to open position whereby to supply fluid to the pitch changing mechanism for propeller reversing, motion transmitting means engaging the feathering valve including a roller and a link movable over the roller between a first and a second position without effecting movement of the feathering valve, the link being cammed upwardly by the roller as the link moves from its second to a third position whereby to effect opening movement of the feathering valve, a plunger disposed below said link and movable upwardly into engagement therewith in the second position only of the link to elevate it similarly to said roller, actuating means engaging said control valve and operable to open the control valve, and manual operating means for said actuating means including a cam engaging said motion transmitting means and adapted to place said link in its first position while said control valve is open for propeller reversing.

4. A control system for an aeronautical propeller having hydraulic pitch changing mechanism and comprising, a feathering valve and a control valve connected with the pitch changing mechanism and connected with a source of hydraulic fluid under pressure, the feathering valve being selectively movable to open position whereby to supply fluid to the pitch changing mechanism for propeller feathering and the control valve being selectively movable to open position whereby to supply fluid to the pitch changing mechanism for propeller reversing, a three position motion transmitting means engaging the feathering valve and movable between a first and a second position without opening the feathering valve and movable from its second to a third position to open the feathering valve, a plunger engageable with said motion transmitting means in its said second position only to move it to its said third position, actuating means engaging said control valve and operable to open the control valve, and manual operating means for said motion transmitting means and said actuating means including a cam engaging said motion transmitting means and operable to move the motion transmitting means between its first, second and third positions, the said cam being adapted to place said motion transmitting means in its first position while said control valve is open for propeller reversing.

5. A control system for an aeronautical propeller having hydraulic pitch changing mechanism and comprising, a feathering valve and a control valve connected with the pitch changing mechanism and connected with a source of hydraulic fluid under pressure, the feathering valve being selectively movable to open position whereby to supply fluid to the pitch changing mechanism for propeller feathering and the control valve being selectively movable to open position whereby to supply fluid to the pitch changing mechanism for propeller reversing, motion transmitting means engaging the feathering valve including a link movable between a first and a second position without effecting movement of the feathering valve and movable from its second to a third position to effect opening movement of the feathering valve, a plunger engageable with said link in its said second position only to move it to its said third position, actuating means engaging said control valve and operable to open the control valve, and manual operating means for said motion transmitting means and said actuating means including a cam engaging said motion transmitting means and operable to move said link between its first, second and third positions, the said cam being adapted to place said link in its first position while said control valve is open for propeller reversing.

6. A control system for an aeronautical propeller having hydraulic pitch changing mechanism and comprising, a feathering valve and a control valve connected with the the pitch changing mechanism and connected with a source of hydraulic fluid under pressure, the feathering valve being selectively movable to open position whereby to supply fluid to the pitch changing mechanism for propeller feathering and the control valve being selectively movable to open position whereby to supply fluid to the pitch changing mechanism for propeller reversing, motion transmitting means engaging the feathering valve including a roller and a link movable over the roller between a first and a second position without effecting movement of the feathering valve, the link being cammed upwardly by the roller as the link moves from its second to a third position whereby to effect opening movement of the feathering valve, a plunger disposed below said link and movable upwardly into engagement therewith in the second position only of the link to elevate it similarly to the said roller, actuating means engaging said control valve and operable to open the control valve, and manual operating means for said motion transmitting means and said actuating means including a cam engaging said motion transmitting means and operable to move said link between its first, second and third positions, the said cam being adapted to place said link in its first position while said control valve is open for propeller reversing.

7. A control system for an aeronautical propeller having hydraulic pitch changing mechanism and comprising, a feathering valve and a control valve connected with the pitch changing mechanism and connectible with a source of hydraulic fluid under pressure, the feathering valve being selectively movable to open position for propeller feathering and the control valve being selectively movable to open position for propeller reversing, a three-position actuator for the feathering valve movable between a first and second position without opening the feathering valve and movable from its second to a third position to open the feathering valve, a first operator engageable with said actuator in its second position only to move it to its third position, actuating means for said control valve, and a second operator controlling said three-position actuator and said actuating means and adapted to place said three-position actuator in its first position when said actuating means is operated to open said control valve.

References Cited in the file of this patent
UNITED STATES PATENTS
2,507,671    May ------------------ May 16, 1950